US012675240B2

(12) United States Patent
Joh

(10) Patent No.: US 12,675,240 B2
(45) Date of Patent: Jul. 7, 2026

(54) STORAGE DEVICE PROVIDING PACKET DESCRIPTOR FLAG, METHOD OF OPERATING THE SAME, AND METHOD OF OPERATING ELECTRONIC DEVICE HAVING THE SAME

(71) Applicant: Samsung Electronics Co., Ltd., Suwon-si (KR)

(72) Inventor: Minsung Joh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 156 days.

(21) Appl. No.: 18/805,780

(22) Filed: Aug. 15, 2024

(65) Prior Publication Data

US 2025/0217077 A1 Jul. 3, 2025

(30) Foreign Application Priority Data

Dec. 27, 2023 (KR) ........................ 10-2023-0192245

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ...... G06F 3/0659; G06F 3/0604; G06F 3/067; G06F 13/16; G06F 13/4234
See application file for complete search history.

(56) References Cited

U.S. PATENT DOCUMENTS

| | | | |
|---|---|---|---|
| 9,077,761 B2 | 7/2015 | Nelogal et al. | |
| 10,606,784 B1 | 3/2020 | Jreij et al. | |
| 10,853,204 B2 | 12/2020 | Bisa et al. | |
| 2003/0126238 A1 | 7/2003 | Kohno et al. | |
| 2007/0220310 A1* | 9/2007 | Sharma ............... | G06F 11/1443 714/6.12 |
| 2009/0019278 A1 | 1/2009 | Shah et al. | |
| 2012/0166576 A1* | 6/2012 | Orsini ................. | H04L 67/1097 709/217 |
| 2014/0281070 A1 | 9/2014 | Natu et al. | |
| 2015/0169453 A1 | 6/2015 | Shanbhogue et al. | |
| 2016/0308828 A1 | 10/2016 | Lee et al. | |
| 2019/0138756 A1 | 5/2019 | Natu et al. | |
| 2025/0307638 A1* | 10/2025 | Bhattacharyya ..... | G06N 3/0895 |

* cited by examiner

*Primary Examiner* — Hiep T Nguyen
(74) *Attorney, Agent, or Firm* — Muir Patent Law, PLLC

(57) ABSTRACT

An electronic device which including a host device and a storage device. A method of operating the electronic device includes providing, by the host device, a first message including a plurality of packets to the storage device, providing, by the host device, a first command for checking a status of the storage device to the storage device, providing, by the storage device in response to the first command, the host device with a first response including a packet descriptor flag indicating that a first packet among the plurality of packets of the first message is dropped, and providing, by the host device, the storage device with a second command requesting first packet descriptor information of the first packet based on the packet descriptor flag of the first response.

20 Claims, 14 Drawing Sheets

FIG. 6

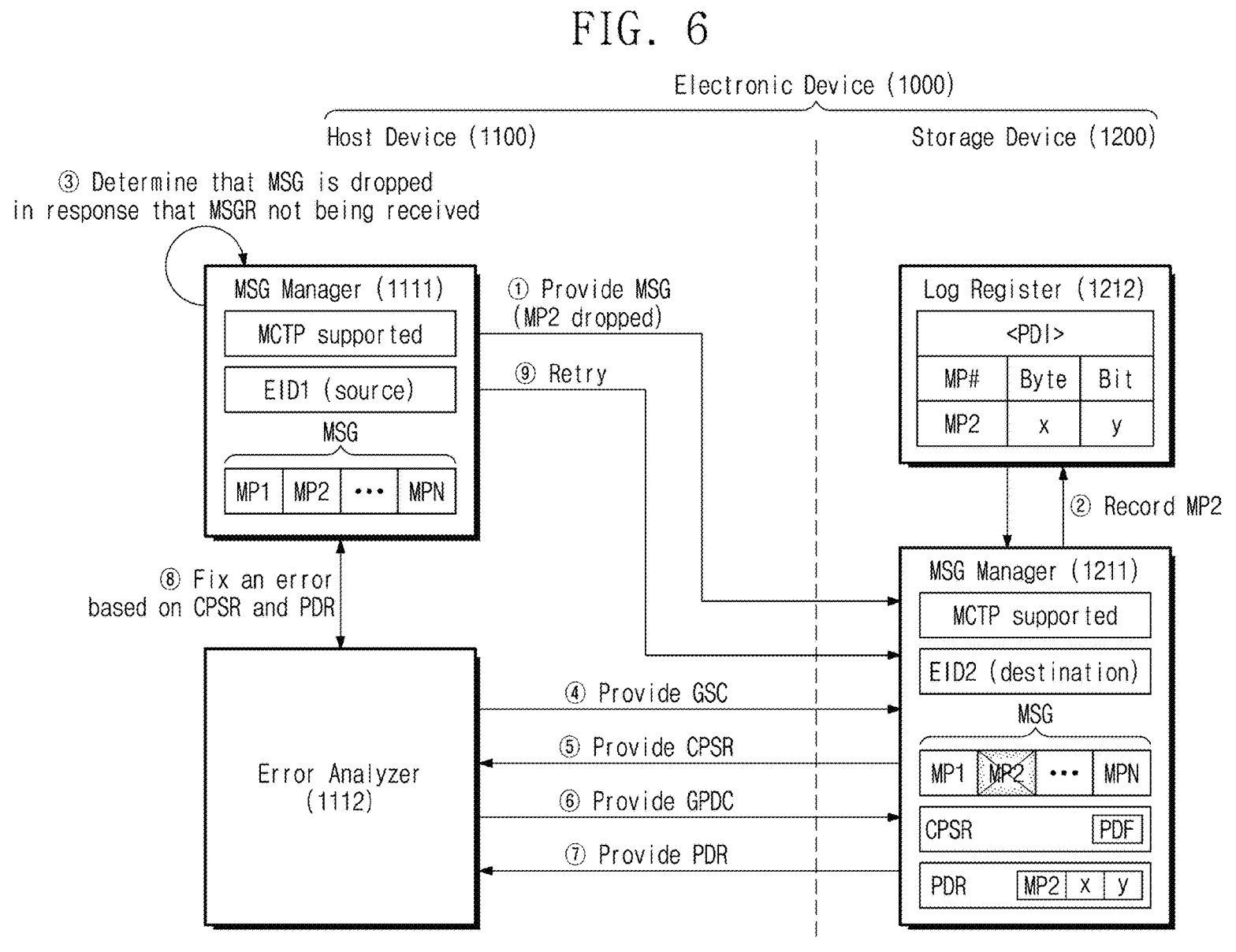

Electronic Device (1000)

Storage Device (1200)

Host Device (1100)

Log Register (1212)

| <PDI> | | |
|---|---|---|
| MP# | Byte | Bit |
| MP2 | x | y |

② Record MP2

MSG Manager (1211)

MCTP supported

EID2 (destination)

MSG

| MP1 | MP2 | ... | MPN |

CPSR [ PDF ]

PDR [ MP2 | x | y ]

MSG Manager (1111)

MCTP supported

EID1 (source)

MSG

| MP1 | MP2 | ... | MPN |

Error Analyzer (1112)

① Provide MSG (MP2 dropped)

⑨ Retry

③ Determine that MSG is dropped in response that MSGR not being received

④ Provide GSC

⑤ Provide CPSR

⑥ Provide GPDC

⑦ Provide PDR

⑧ Fix an error based on CPSR and PDR

FIG. 7

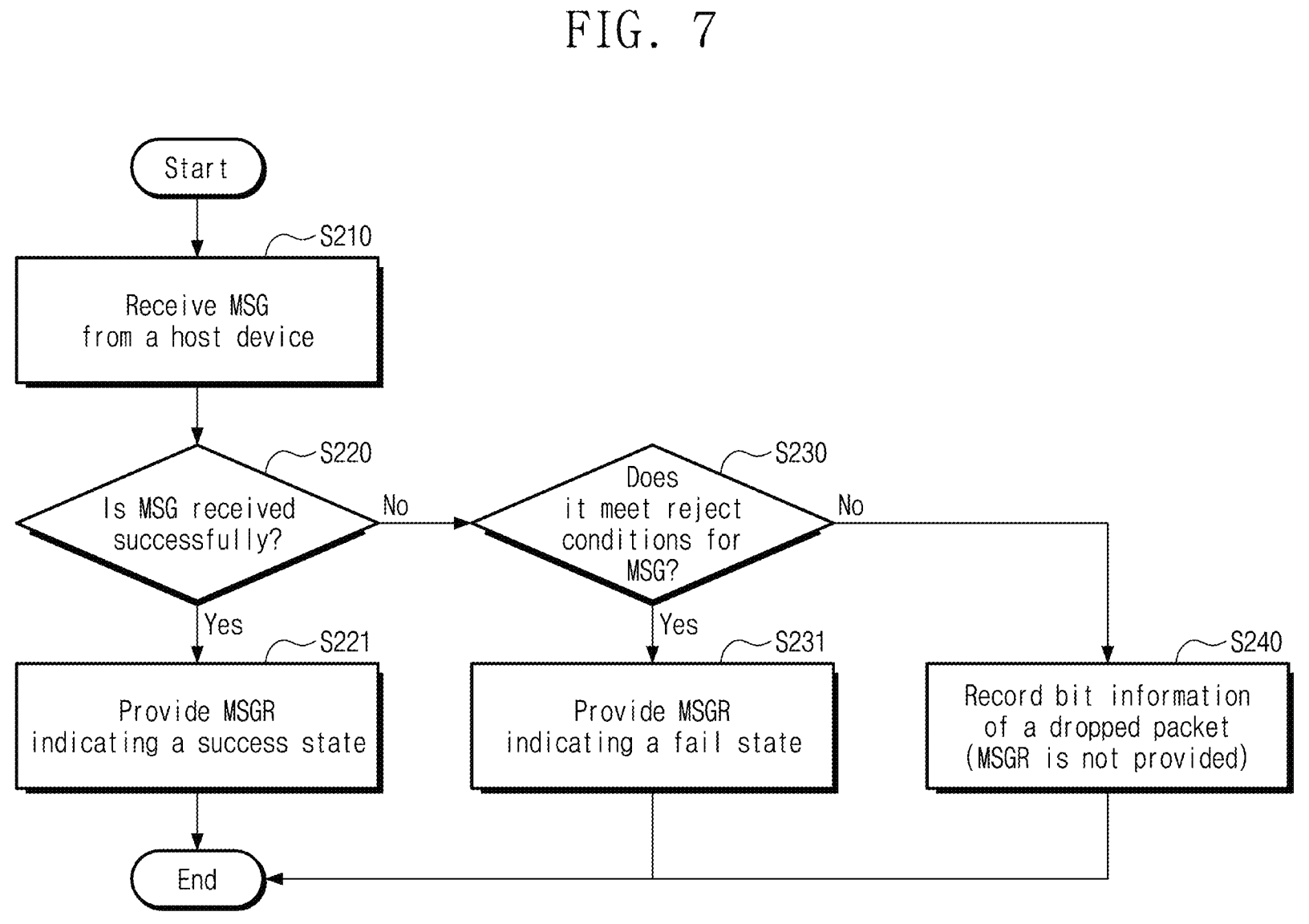

Start

S210 — Receive MSG from a host device

S220 — Is MSG received successfully?

S221 — Yes — Provide MSGR indicating a success state

No

S230 — Does it meet reject conditions for MSG?

S231 — Yes — Provide MSGR indicating a fail state

S240 — No — Record bit information of a dropped packet (MSGR is not provided)

End

FIG. 10

CPSR

| | <CPSR structure> | |
|---|---|---|
| Bits | Description | |
| 15 | Pause flag (PFLG) | |
| 14 | NVM subsystem reset occurred (NSSRO) | |
| 13 | Bad packet or other physical layer (BPOPL) | |
| 12 | Bad, unexpected, or expired message tag (BUEMT) | |
| 11 | Out-of-sequence packet sequence number (OSPSN) | |
| 10 | Unexpected middle or end of packet (UMEP) | |
| 09 | Incorrect transmission unit (ITU) | |
| 08 | Unknown destination ID (UDSTID) | |
| 07 | Bad header version (BHVS) | |
| 06 | Unsupported transmission unit (UTUNT) | |
| 05 | Timeout waiting for a packet (WPTT) | |
| 04 | Bad message integrity check error (BMICE) | |
| 03 | Command message to non-idle command slot (CMNICS) | |
| 02 | Reserved (PDF is added herein) | |
| 01 | Slot command servicing state (SSTA) | |
| 00 | (0h: idle, 1h: receive, 2h: process, 3h: transmit) | |

FIG. 11

<Basic Management Data structure>

| Byte | Data type | Description | Detail |
|---|---|---|---|
| 00 | | | Length of status |
| 01 | | | Status flags (SFLGS) |
| 02 | | | SMART warnings |
| 03 | Dynamic health data | | Composite temperature (CTemp) |
| 04 | | | Percentage drive life used (PDLU) |
| 05 | | | Composite temperature over temperature warning threshold (optional) |
| 06 | | | Current power (optional) |
| 07 | | | PEC |
| 08 | | | Length of identificaiton |
| 09:10 | Product data | | Vendor ID |
| 11:30 | | | Serial number |
| 31 | | | PEC |
| 32:255 | Vendor specific (PDI is added herein) | | |

PDR

FIG. 12

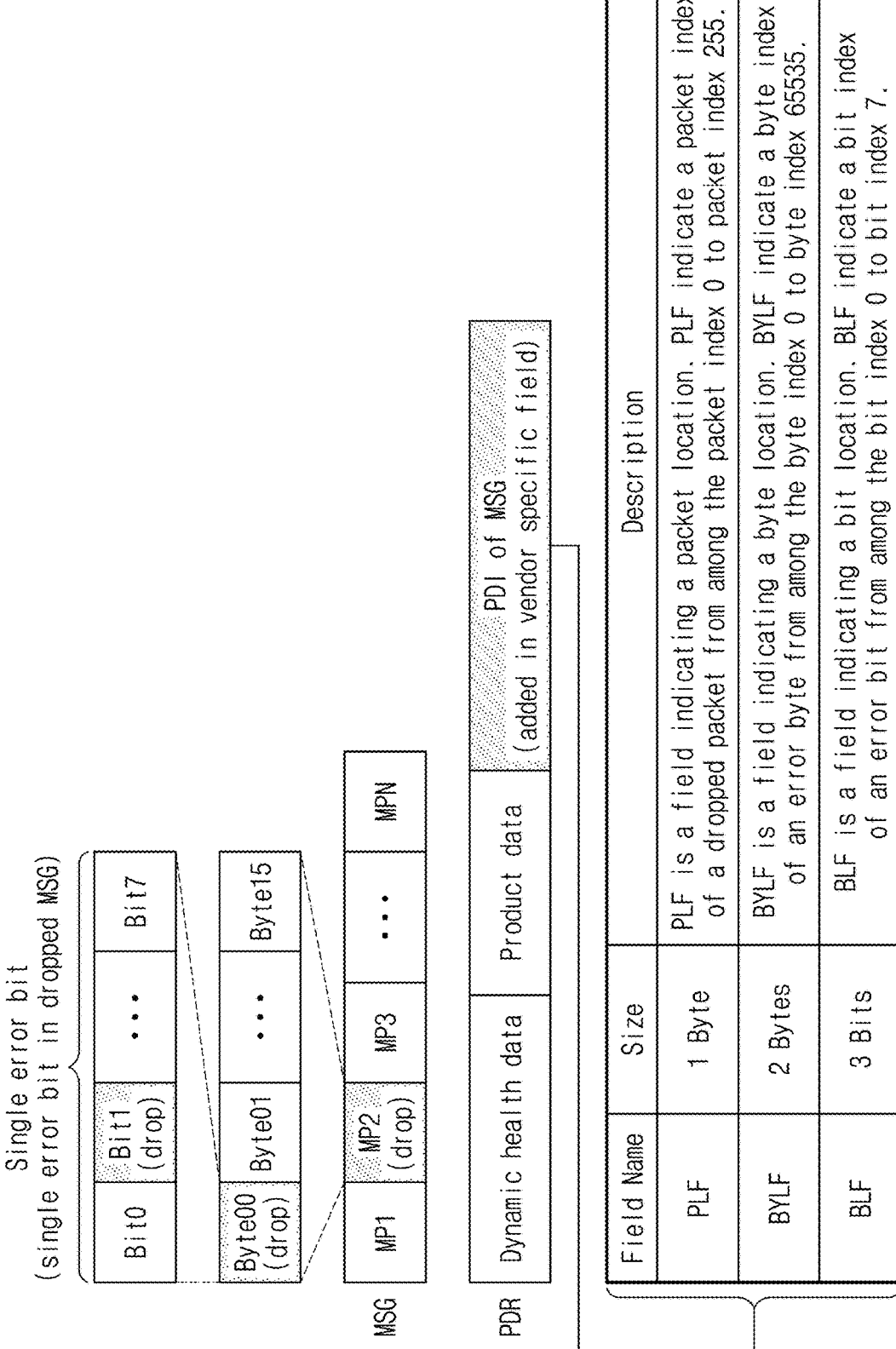

| Field Name | Size | Description |
|---|---|---|
| PLF | 1 Byte | PLF is a field indicating a packet location. PLF indicate a packet index of a dropped packet from among the packet index 0 to packet index 255. |
| BYLF | 2 Bytes | BYLF is a field indicating a byte location. BYLF indicate a byte index of an error byte from among the byte index 0 to byte index 65535. |
| BLF | 3 Bits | BLF is a field indicating a bit location. BLF indicate a bit index of an error bit from among the bit index 0 to bit index 7. |

STORAGE DEVICE PROVIDING PACKET DESCRIPTOR FLAG, METHOD OF OPERATING THE SAME, AND METHOD OF OPERATING ELECTRONIC DEVICE HAVING THE SAME

CROSS-REFERENCE TO RELATED APPLICATIONS

This application claims priority under 35 U.S.C. § 119 to Korean Patent Application No. 10-2023-0192245 filed on Dec. 27, 2023, in the Korean Intellectual Property Office, the disclosure of which is incorporated by reference herein in its entirety.

BACKGROUND

Embodiments of the present disclosure described herein relate to a storage device which manages packets, and more particularly, relate to a storage device which provides a packet descriptor flag, a method of operating the same, and a method of operating an electronic device including the same.

A memory device stores data depending on a write request, and outputs the stored data depending on a read request. For example, a memory device is classified as a volatile memory device, in which stored data is lost when a power supply is cut off, such as a dynamic random access memory (DRAM) and a static RAM (SRAM), or as a non-volatile memory device, which retains stored data even when the power supply is cut off, such as a flash memory device, a phase-change RAM (PRAM), a magnetic RAM (MRAM) and a resistive RAM (RRAM).

A storage device may include a non-volatile memory device which stores the data received from a host device. The data may be implemented by multiple packets. Some of the plurality of packets communicated between the host device and the storage device may be dropped. To transmit the dropped packets again, communication resources (e.g., a transmission time, electric power consumption, and a communication bandwidth) between the host device and the storage device may be required. A technique for efficiently managing the dropped packets may be required.

SUMMARY

Embodiments of the present disclosure provide a storage device which provides a packet descriptor flag, a method of operating the same, and a method of operating an electronic device including the same.

According to an embodiment, an electronic device includes a host device and a storage device. A method of operating the electronic device includes providing, by the host device, a first message including a plurality of packets to the storage device, providing, by the host device, the storage device with a first command for checking a status of the storage device, providing, by the storage device in response to the first command, the host device with a first response including a packet descriptor flag indicating that a first packet among the plurality of packets of the first message is dropped, and providing, by the host device, the storage device with a second command requesting first packet descriptor information of the first packet based on the packet descriptor flag of the first response.

According to an embodiment, a storage device communicates with a host device. A method of operating the storage device includes receiving a first message including a plurality of packets from the host device, storing packet descriptor information of a dropped packet among the plurality of packets in a log register of the storage device, receiving a first command for checking a status of the storage device from the host device, and providing, based on the first command and the packet descriptor information, the host device with a first response including a packet descriptor flag indicating that the dropped packet exists.

According to an embodiment, a storage device includes a log register, and a message manager that receives a first message including a plurality of packets from a host device and stores packet descriptor information of the dropped packet in the log register when a dropped packet exists in the plurality of packets. The message manager receives a first command for checking a status of the storage device from the host device and provides, based on the first command and the packet descriptor information stored in the log register, the host device with a first response including a packet descriptor flag indicating that the dropped packet exists.

BRIEF DESCRIPTION OF THE FIGURES

The above and other objects and features of the present disclosure will become apparent by describing in detail embodiments thereof with reference to the accompanying drawings.

FIG. 6 is a diagram illustrating a method of operating an electronic device according to some embodiments of the present disclosure.

FIG. 7 is a flowchart explaining a method of operating a storage device according to some embodiments of the present disclosure.

FIG. 10 is a diagram illustrating a control primitive specific response (CPSR) structure according to some embodiments of the present disclosure.

FIG. 11 is a diagram illustrating a basic management data structure according to some embodiments of the present disclosure.

FIG. 12 is a diagram illustrating a message and a packet descriptor response according to some embodiments of the present disclosure.

DETAILED DESCRIPTION

Hereinafter, embodiments of the present disclosure will be described clearly and in detail so that a person skilled in the technical field of the present disclosure may easily practice the embodiments of the present disclosure.

Figure 1:
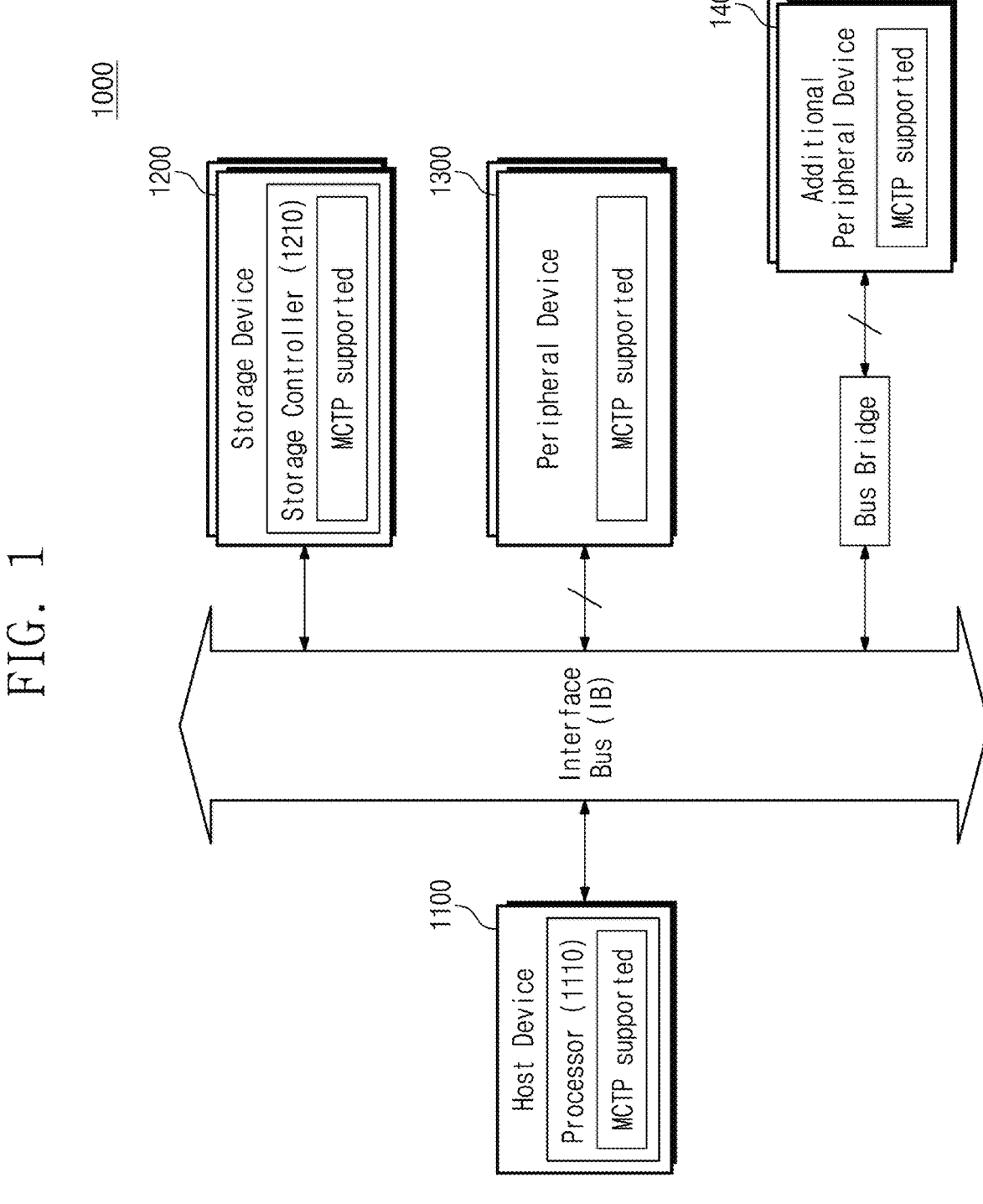
FIG. 1 is a block diagram of an electronic device according to an embodiment of the present disclosure.

FIG. 1 is a block diagram of an electronic device according to an embodiment of the present disclosure. Referring to FIG. 1, an electronic device 1000 may be a computing system configured to process various information or to store the processed information as data. In some embodiments, the electronic device 1000 may be implemented as a personal computer (PC), a notebook, a laptop, a server, a workstation, a tablet PC, a smartphone, a digital camera, a black box, and the like. The electronic device 1000 may include a host device 1100, a storage device 1200, a peripheral device 1300, an additional peripheral device 1400, an interface bus IB, and a bus bridge.

The interface bus IB may be connected to the host device 1100, the storage device 1200, the peripheral device 1300, and the bus bridge. The bus bridge may be connected to the interface bus IB and the additional peripheral device 1400. For example, the interface bus IB may be implemented as a PCIe (Peripheral Component Interconnect express) bus. The bus bridge may be implemented as a PCIe/PCIe bus bridge, and the additional peripheral device 1400 may include an additional PCIe bus and at least one of communication devices (e.g., devices which perform data communication with the host device 1100) connected thereto.

The host device 1100 may control overall operations of the electronic device 1000. The host device 1100 may include a processor 1110. The processor 1110 may store data in the storage device 1200, may read data stored in the storage device 1200, or may delete data stored in the storage device 1200. The processor 1110 may provide data to the peripheral device 1300 and/or the additional peripheral device 1400, or may receive data from the peripheral device 1300 and/or the additional peripheral device 1400.

The processor 1110 may support a management component transport protocol (MCTP). The MCTP may be a protocol which supports communications between various intelligent hardware components constituting the platform management subsystem. An MCTP-based communication model may include a message format, a transport description, message exchange patterns, and endpoint characteristics. The processor 1110 may perform the MCTP-based communications with various communication devices, which support the MCTP, such as the storage device 1200, the peripheral device 1300, and the additional peripheral device 1400.

The storage device 1200 may be connected to the interface bus IB. The storage device 1200 may store data, may provide the stored data to the host device 1100, or may delete the stored data, depending on a request received from the host device 1100 through the interface bus IB. Additionally, the storage device 1200 may store data, may provide data, or may delete data depending on a request from a communication device performing a data management function among the peripheral device 1300 and the additional peripheral device 1400. The storage device 1200 may also be referred to as a "peripheral device" in relation to the host device 1100.

The storage device 1200 may include a storage controller 1210. The storage controller 1210 may support the MCTP. The storage controller 1210 may perform the MCTP-based communications with at least some of the host device 1100, the peripheral device 1300, and the additional peripheral device 1400.

The peripheral device 1300 may be connected to the interface bus IB. The peripheral device 1300 may support the MCTP. The peripheral device 1300 may be omitted, or a plurality of peripheral devices 1300 may be present. The peripheral device 1300 may be one of an additional storage device, a volatile memory device, such as a dynamic random access memory (DRAM) or a static RAM (SRAM), or one of a variety of communication devices such as a hardware accelerator, Network Interface Card (NIC), Ethernet switch, etc.

The additional peripheral device 1400 may be connected to the interface bus IB through the bus bridge. The additional peripheral device 1400 may be omitted, or a plurality of additional peripheral devices 1400 may be present. The additional peripheral device 1400 may include an additional interface bus connected to the bus bridge, and at least one communication device (e.g., devices similar to the peripheral device 1300) which is connected to the additional interface bus and supports the MCTP.

Figure 2:
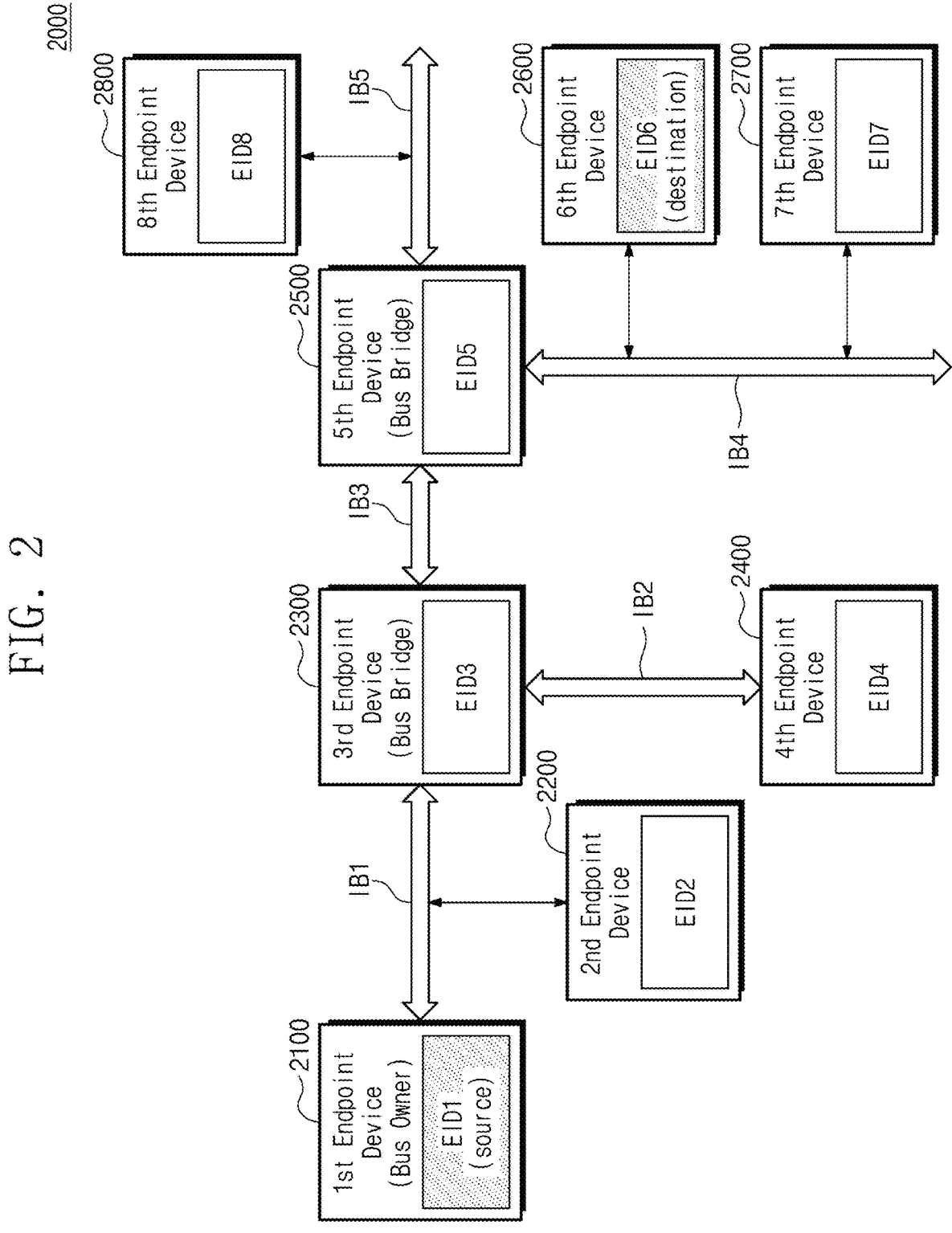
FIG. 2 is a block diagram of an electronic device according to some embodiments of the present disclosure.

FIG. 2 is a block diagram of an electronic device according to some embodiments of the present disclosure. Referring to FIG. 2, an electronic device 2000 may include first to eighth endpoint devices 2100 to 2800 and first to fifth interface buses IB1 to IB5. The electronic device 2000 may support the MCTP.

The first endpoint device 2100 may be connected to the second endpoint device 2200 and the third endpoint device 2300 through the first interface bus IB1. The first endpoint device 2100 may also be referred to as a "bus owner". The bus owner may assign endpoint identifications EIDs to peripheral devices. The EID may be unique information for distinguishing devices capable of communicating based on the MCTP. For example, the first endpoint device 2100, which is the bus owner, may grant an EID1 to the first endpoint device 2100, and may grant the EID2 to the EID8 to the second to eighth endpoint devices 2200 to 2800, respectively. The first endpoint device 2100 may correspond to the host device 1100 of FIG. 1.

The second endpoint device 2200 may be connected to the first interface bus IB1. The second endpoint device 2200 may correspond to the storage device 1200 or the peripheral device 1300 of FIG. 1.

The third endpoint device 2300 may be connected to the first to third interface buses IB1 to IB3. The third endpoint device 2300 may be the bus bridge connecting interfaces which are different from each other.

The fourth endpoint device 2400 may be connected to the second interface bus IB2. The fourth endpoint device 2400 may correspond to the storage device 1200, the peripheral device 1300, or the additional peripheral device 1400 of FIG. 1.

The fifth endpoint device 2500 may be connected to the third to fifth interface buses IB3 to IB5. The fifth endpoint device 2500 may be a bus bridge.

The sixth endpoint device 2600 may be connected to the fourth interface bus IB4. The seventh endpoint device 2700 may be connected to the fourth interface bus IB4. The eighth endpoint device 2800 may be connected to the fifth interface bus IB5. Each of the sixth to eighth endpoint devices 2600 to 2800 may correspond to the storage device 1200, the peripheral device 1300, or the additional peripheral device 1400 of FIG. 1.

In some embodiments, the first endpoint device 2100 and the sixth endpoint device 2600 may perform the MCTP-based communication. More specifically, the first and sixth endpoint devices 2100 and 2600 may be electrically connected through at least one interface bus. The first endpoint device 2100 may be referred to as a "primary device". The EID1 of the first endpoint device 2100 may be a source EID. The sixth endpoint device 2600 may be referred to as a "subordinate device". The EID6 of the sixth endpoint device 2600 may be a destination EID.

The first endpoint device 2100 may broadcast a MCTP-based message including information about the source and destination (i.e., the EID1, the EID6). The sixth endpoint device 2600 may receive the broadcasted message through the first interface bus IB1, the third endpoint device 2300, the third interface bus IB3, the fifth endpoint device 2500, and the fourth interface bus IB4.

The sixth endpoint device 2600 may process the received message. The sixth endpoint device 2600 may provide a message response to the first endpoint device 2100 by broadcasting a message response indicating the processing state of the received message (e.g., success, failure). When some of the packets of a broadcasted message are dropped, the operation of providing a message response may be omitted and the entire broadcasted message including the dropped packets may be discarded.

Figure 3:
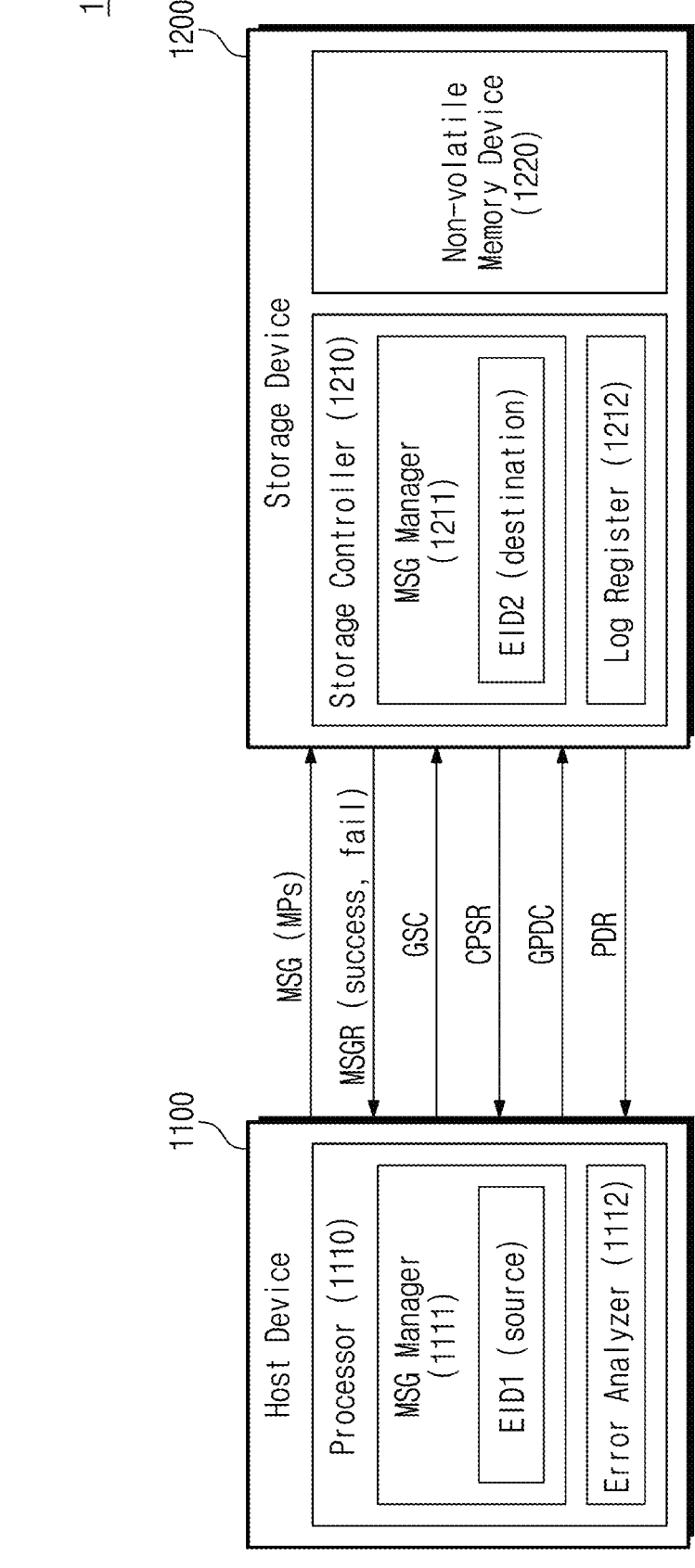
FIG. 3 is a block diagram illustrating the electronic device of FIG. 1 according to some embodiments of the present disclosure.

FIG. 3 is a block diagram illustrating the electronic device of FIG. 1 according to some embodiments of the present disclosure. Referring to FIG. 3, the electronic device 1000 may include the host device 1100 and the storage device 1200. The host device 1100 and the storage device 1200 may respectively correspond to the host device 1100 and the storage device 1200 of FIG. 1. The host device 1100 and the storage device 1200 may support the MCTP.

The host device 1100 may include the processor 1110 and an error analyzer 1112. The processor 1110 may be a computing device, which is configured to process various information, such as a central processing unit (CPU), a graphics processing unit (GPU), a neural processing unit (NPU), a tensor processing unit (TPU), etc.

The processor 1110 may include a message manager 1111. The message manager 1111 may be implemented in hardware, software, or a combination thereof. When at least part of the message manager 1111 is implemented as software, the processor 1110 may perform the functions of the message manager 1111 by loading instructions and executing the loaded instructions.

The message manager 1111 may function as a bus owner. The host device 1100 including the message manager 1111 may be referred to as a "primary device". For example, the message manager 1111 may assign the EID1 to the message manager 1111. The EID1 may be the source EID. The message manager 1111 may perform the MCTP-based communication with another device (e.g., the storage device 1200) which supports the MCTP. For example, the message manager 1111 may provide a message MSG to a message manager 1211. The message MSG may be a communication signal which complies with the MCTP.

The error analyzer 1112 may analyze errors in the message MSG managed by the message manager 1111 and may correct the analyzed errors. For example, an error may mean that at least some of the bits constituting packets corresponding to the message MSG are inverted. The message manager 1111 may retransmit the error-corrected message MSG to another device (e.g., the storage device 1200).

The storage device 1200 may include the storage controller 1210 and a non-volatile memory device 1220. The storage controller 1210 may store data in the non-volatile memory device 1220, may read the stored data, or may delete the stored data, under control of the host device 1100 or an algorithm of the internal firmware.

The storage controller 1210 may include the message manager 1211 and a log register 1212. The message manager 1211 may perform the MCTP-based communication with the message manager 1111 of the host device 1100. The storage device 1200 including the message manager 1211 may be referred to as a "subordinate device". For example, the message manager 1211 may receive the EID2 assigned from the message manager 1111. The EID2 may be the destination EID. The message manager 1211 may process the message MSG received from the message manager 1111.

Under control of the storage controller 1210, the log register 1212 may store packet descriptor information describing at least one error bit which causes the drop of the message MSG, may provide the packet descriptor information to the storage controller 1210, and may delete the packet descriptor information.

The non-volatile memory device 1220 may store data under control of the storage controller 1210. The non-volatile memory device 1220 may maintain stored data even when the power supply is cut off. For example, the non-volatile memory device 1220 may be implemented as a flash memory device, phase-change RAM (PRAM), Magnetic RAM (MRAM), resistive RAM (RRAM), etc.

Below, examples of signals communicated between the host device 1100 and the storage device 1200 will be described in more detail.

The message manager 1111 of the host device 1100 may transmit the message MSG to the message manager 1211 of the storage device 1200. The message MSG may be the MCTP-based communication signal. For example, the message MSG may include a plurality of message packets (i.e., packets) MP. Each of the plurality of packets MP may have an MCTP packet structure. The MCTP packet structure will be described in detail with reference to FIG. 9.

The message manager 1211 may receive the message MSG from the message manager 1111. When the message MSG satisfies the communication rules of the MCTP, the message manager 1211 may determine that the message MSG is successfully received and provide the message manager 1111 with a message response MSGR indicating the success state of the message MSG (e.g., the message MSG is successfully received).

When the message MSG does not satisfy the communication rules of the MCTP and satisfies the rejection condition, the message manager 1211 may provide the message manager 1111 with a message response MSGR indicating that the message MSG is in a failure state (e.g., the message MSG is rejected). The rejection condition may refer to one of the conditions defined for rejecting the message MSG in the MCTP standard.

The message manager 1211 may drop the message MSG when the message MSG does not satisfy the communication rules of the MCTP and does not satisfy the rejection condition. When the message MSG is dropped, a message response MSGR may not be separately returned. The message manager 1211 may store packet descriptor information, which describes at least one of error bits which causes the message MSG to be dropped, in the log register 1212.

In some embodiments, examples of situations in which the message MSG is dropped include: a case where the transmission waiting time of the packet MP of the message MSG exceeds the timeout period; a case where the packet sequence number of the packet MP of the message MSG violates the packet generation rules; a case where the packet size of the packet MP of the message MSG exceeds the declared packet size (e.g., the size of the first packet of the message MSG); and a case where an error is present in an integrity check IC field of the packet MP of the message MSG. The described conditions are only examples, and the message MSG may be dropped based on other conditions.

The message manager 1111 may provide a get state command GSC to the message manager 1211 when the message response MSGR is not received during the reference time period. The reference time period may define the time at which the message response MSGR is typically expected to be received. The reference time period may be a preset type period. The get state command GSC may be a command for checking the status of a device (e.g., the storage device 1200) with the destination EID.

The message manager 1211 may check the status of the storage device 1200 based on the get state command GSC and may return a control primitive specific response CPSR indicating the checked state to the message manager 1111.

In some embodiments, the control primitive specific response CPSR may have a CPSR structure defined in the Non-Volatile Memory express Management Interface (NVMe-MI) standard. The CPSR structure will be described in detail with reference to FIG. 10.

In some embodiments, the control primitive specific response CPSR may include a packet descriptor flag. The packet descriptor flag may indicate whether the log register 1212 stores packet descriptor information of the dropped message MSG. When the packet descriptor information is stored in the log register 1212 (in other words, when the packet of the message MSG is dropped), the message manager 1211 may provide the message manager 1111 with the control primitive specific response CPSR including a packet descriptor flag including the first bit value (e.g., "1"). When the packet descriptor information is absent from the log register 1212 (in other words, when the packet of the message MSG is not dropped), the message manager 1211 may provide the message manager 1111 with the control primitive specific response CPSR including a packet descriptor flag including the second bit value (e.g., "0").

The message manager 1111 may refer to the packet descriptor flag of the control primitive specific response CPSR and may provide a get packet descriptor command GPDC to the message manager 1211. When the packet descriptor flag has the first bit value, the message manager 1111 may provide the get packet descriptor command GPDC to the message manager 1211 to obtain packet descriptor information. When the packet descriptor flag has the second bit value, the message manager 1111 may not generate the get packet descriptor command GPDC.

The message manager 1211 may return a packet descriptor response PDR to the message manager 1111 based on the get packet descriptor command GPDC received from the message manager 1111. The packet descriptor response PDR may include packet descriptor information stored in the log register 1212.

In some embodiments, the packet descriptor response PDR may have a basic management data structure defined in the NVMe-MI standard. The packet descriptor response PDR may include packet descriptor information for a single error bit or packet descriptor information for multiple error bits. The basic management data structure of the packet descriptor response PDR will be described in detail with reference to FIGS. 11, 12, and 13. In some embodiments, the electronic device 1000 may support in-band communication. For example, the NVMe-MI standard may support in-band communication and out-of-band communication. The host device 1100 and the storage device 1200 may transmit the get state command GSC, the control primitive specific response CPSR, the get packet descriptor command GPDC, and the packet descriptor response PDR by utilizing the in-band communication of the NVMe-MI standard.

Figure 4:
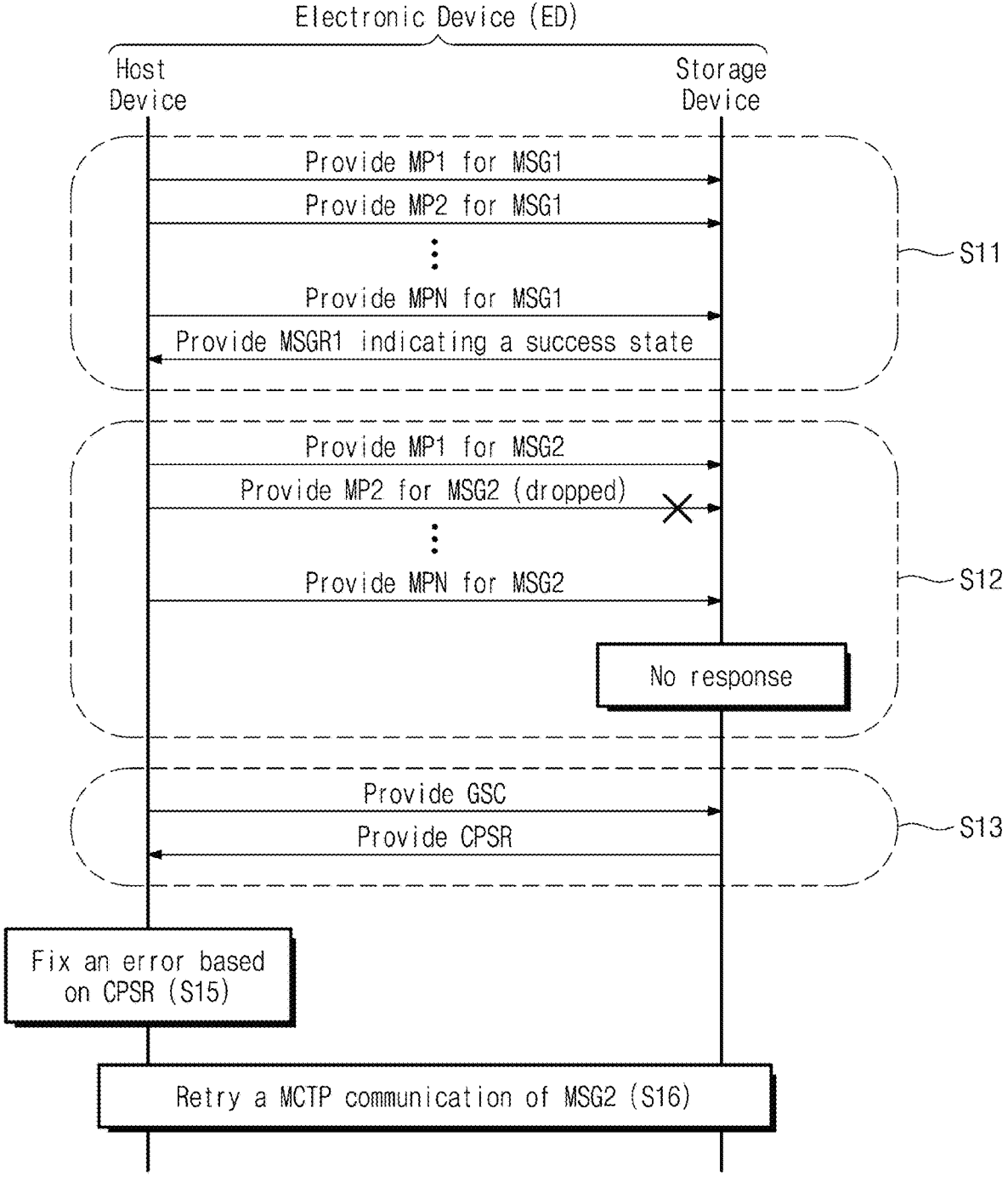
FIG. 4 is a flowchart explaining a method of operating a conventional electronic device.

FIG. 4 is a flowchart explaining a method of operating a conventional electronic device. Referring to FIG. 4, a conventional electronic device ED may include a host device and a storage device. The host device and the storage device may support the MCTP. A conventional electronic device ED is described for better understanding of the present disclosure and is not intended to limit the scope and spirit of the invention.

In operation S11, the host device may provide a first message MSG1 to the storage device. More specifically, the host device may sequentially provide first to Nth packets MP1 to MPN of the first message MSG1 to the storage device. N is a natural number and may represent the number of packets included in one message. In certain embodiments, N may be 32, but the value of N may be varied in various embodiments. The storage device may successfully receive the first message MSG1. In response to successfully receiving the first message MSG1, the storage device may provide a first message response MSGR1 indicating a success state of the first message MSG1 to the host device.

In operation S12, the host device may provide a second message MSG2 to the storage device. More specifically, the host device may sequentially provide the first to Nth packets MP1 to MPN of the second message MSG2 to the storage device. The second packet MP2 of the second message MSG2 may be dropped. In this case, the storage device may not separately provide a second message response indicating the reception state (e.g., success state or failure state) of the second message MSG2 to the host device.

In operation S13, the host device may provide the get state command GSC to the storage device in response to not receiving a second message response to the second message MSG2 during a reference time period. The storage device may check the status of the storage device based on the get state command GSC and provide the control primitive specific response CPSR indicating the checked status to the host device.

In the typical electronic device ED, the control primitive specific response CPSR may not include a packet descriptor flag. It may be difficult for a host device of the conventional electronic device ED to identify an error bit which causes the second packet MP2 of the second message MSG2 to be dropped (or the second message MSG2 to be dropped).

In operation S15, the host device may correct an error in the second message MSG2 based on the control primitive specific response CPSR. In this case, the host device may not accurately estimate the cause of the drop of the second message MSG2 (e.g., an error bit which causes the drop of the second packet MP2 of the second message MSG2). Accordingly, the host device may incorrectly estimate the drop factor of the second message MSG2, or resources (e.g., error analysis time, transmission time, communication bandwidth, and power consumption) may be excessively required to review all packets MP1 to MPN of the second message MSG2.

In operation S16, the host device and the storage device may retry the MCTP-based communication of the second message MSG2. Because the cause bringing out the drop of the second message MSG2 is not accurately reflected in the previous operation S15, the second message MSG2 according to the retried MCTP-based communication may be dropped. Unlike the failure state, in which it is possible to confirm the failure factor through the message response, a message drop does not return a message response, so it may be difficult to estimate the drop factor which causes the message to be dropped. Accordingly, a technique may be required to record the drop factor of the message and to reflect the recorded drop factor during error correction.

Figure 5:
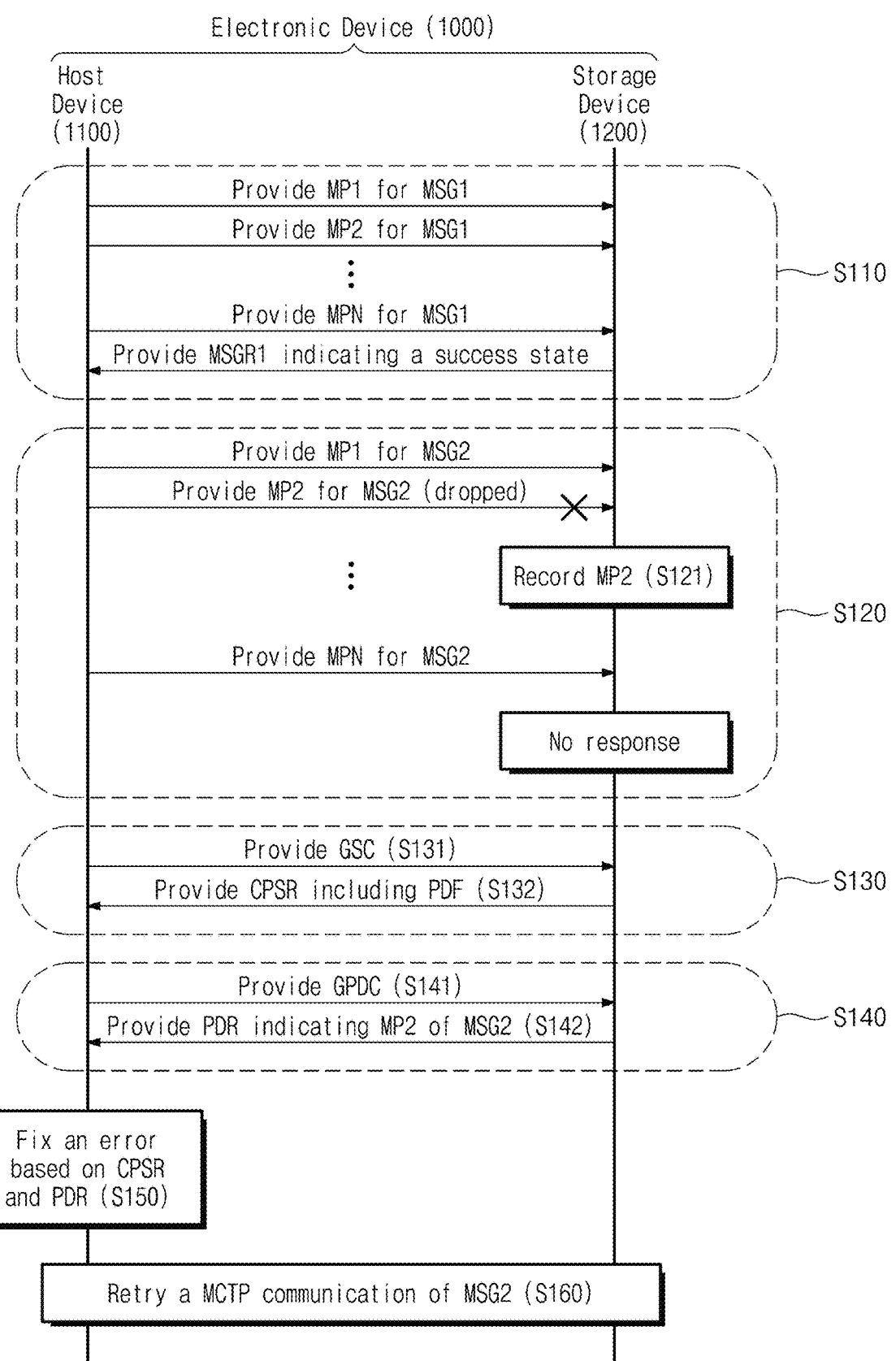
FIG. 5 is a flowchart explaining a method of operating an electronic device according to some embodiments of the present disclosure.

FIG. 5 is a flowchart explaining a method of operating an electronic device according to some embodiments of the present disclosure. Referring to FIG. 5, the electronic device 1000 may include the host device 1100 and the storage device 1200. The host device 1100 and the storage device 1200 may respectively correspond to the host device 1100 and the storage device 1200 of FIG. 1. The host device 1100 and the storage device 1200 may support the MCTP. Because operation S110 is similar to operation S11 of FIG. 4, detailed description thereof is omitted.

In operation S120, the host device 1100 may provide a second message MSG2 to the storage device 1200. Operation S120 may include operation S121. More specifically, the host device 1100 may sequentially provide the first to Nth packets MP1 to MPN of the second message MSG2 to the storage device 1200. The second packet MP2 of the second message MSG2 may be dropped.

In operation S121, the storage device 1200 may record the dropped second packet MP2 of the second message MSG2. For example, the storage device 1200 may include a log register. The storage device 1200 may store packet descriptor information describing at least one error bit which causes the drop of the second packet MP2 of the second message MSG2, in the log register.

Afterwards, the storage device 1200 may sequentially receive the third to Nth packets MP3 to MPN of the second message MSG2 from the host device 1100. Because the second packet MP2 of the second message MSG2 is dropped, the entire second message MSG2 may be dropped. The storage device 1200 may not separately provide the host device with a second message response indicating the reception state (e.g., success state or failure state) of the second message MSG2.

In operation S130, the host device 1100 may check the status of the storage device 1200. Operation S130 may include operation S131 and operation S132. In operation S131, the host device 1100 may provide the get state command GSC to the storage device 1200 in response to not receiving a second message response to the second message MSG2 during a reference time period.

In operation S132, the storage device 1200 may check the status of the storage device 1200 based on the get state command GSC and refer to the log register of the storage device 1200 to determine whether packet descriptor information is stored, and may generate the control primitive specific response CPSR. The control primitive specific response CPSR may include the checked status of the storage device 1200 and a packet descriptor flag PDF. The packet descriptor flag PDF may be a 1-bit sized field indicating whether packet descriptor information is stored in the log register. The storage device 1200 may provide the control primitive specific response CPSR to the host device 1100.

In operation S140, the host device 1100 may obtain packet descriptor information about the dropped message. Operation S140 may include operation S141 and operation S142. In operation S141, the host device 1100 may provide the get packet descriptor command GPDC to the storage device 1200 when the packet descriptor flag PDF of the control primitive specific response CPSR has the first bit value (i.e., in response to checking that packet descriptor information is stored in the log register)

In operation S142, the storage device 1200 may obtain the packet descriptor information stored in the log register of the storage device 1200 based on the get packet descriptor command GPDC and provide the host device 1100 with the packet descriptor response PDR including the packet descriptor information. The packet descriptor information may indicate the dropped second packet MP2 of the second message MSG2. The packet descriptor information may include information for identifying an error bit which causes the second packet MP2 of the second message MSG2 to be dropped. Based on the packet descriptor response PDR, the host device 1100 may identify the dropped second packet MP2 of the second message MSG2 and identify the error bit which causes the drop of the second packet MP2.

In operation S150, the host device 1100 may correct an error in the second message MSG2 based on the control primitive specific response CPSR and the packet descriptor response PDR. In this case, the host device 1100 may accurately identify the cause of the drop of the second message MSG2 (e.g., an error bit which causes the drop of the second packet MP2 of the second message MSG2). Accordingly, the host device 1100 may accurately estimate the drop factor of the second message MSG2 and may reduce the resources required for error correction by selectively reviewing the dropped packet MP2 among all the packets MP1 to MPN of the second message MSG2.

In operation S160, the host device 1100 and the storage device 1200 may retry the MCTP-based communication of the second message MSG2. Based on both the control primitive specific response CPSR and the packet descriptor response PDR in operation S150, the cause of the drop of the second message MSG2 is accurately reflected, so the second message MSG2 according to the retried MCTP-based communication may be transmitted successfully.

For example, operation S160 may include providing the storage device 1200 with a corrected second message MSG2 including error bits corrected by the host device 1100. Operation S160 may further include providing the host device 1100 with a second message response MSGR2, from the storage device 1200, indicating a success state of the corrected second message MSG2 in response to successfully receiving the second message MSG2 corrected by the host device 1100.

FIG. 6 is a diagram illustrating a method of operating an electronic device according to some embodiments of the present disclosure. Referring to FIG. 6, the electronic device 1000 may include the host device 1100 and the storage device 1200. The host device 1100 may be referred to as a "primary device" or a "source endpoint device". The storage device 1200 may be referred to as a "subordinate device" or a "destination endpoint device".

The host device 1100 may include the message manager 1111 and the error analyzer 1112. The message manager 1111 may support the MCTP. The message manager 1111 may have EID1. EID1 may be a source EID. The message manager 1111 may provide a message MSG including one or more packets MP1 to MPN to the message manager 1211 of the storage device 1200. The error analyzer 1112 may analyze error bits of a dropped message MSG and may correct the analyzed error bits.

The storage device 1200 may include the message manager 1211 and the log register 1212. The message manager 1211 may support the MCTP. The message manager 1211 may have the EID2. The EID2 may be a destination EID.

The message manager 1211 may receive the message MSG from the message manager 1111 of the host device 1100.

The message manager 1211 may store packet descriptor information PDI in the log register 1212 to identify at least one error bit which causes a packet to be dropped. The packet descriptor information PDI may include packet location information for identifying a dropped packet among a plurality of packets in a message, and byte location information for identifying an error byte including an error bit among a plurality of bytes corresponding to the dropped packet, and may include bit location information for identifying an error bit among eight bits corresponding to the error byte.

The message manager 1211 may refer to the log register 1212, based on the get state command GSC received from the error analyzer 1112, and generate the control primitive specific response CPSR. The control primitive specific response CPSR may include the packet descriptor flag PDF.

The message manager 1211 may refer to the log register 1212, based on the get packet descriptor command GPDC received from the error analyzer 1112, and generate the packet descriptor response PDR. The packet descriptor response PDR may include the packet location information, the byte location information, and the bit location information of the packet descriptor information PDI.

Hereinafter, a method of operating the electronic device 1000 will be described according to some embodiments of the present disclosure.

In the first operation ①, the message manager 1111 of the host device 1100 may provide the message MSG to the message manager 1211 of the storage device 1200. The message MSG may include one or more packets MP1 to MPN. Each of the one or more packets MP1 to MPN may have the MCTP packet structure. In the process of transmitting the message MSG, the second packet MP2 of the one or more packets MP1 to MPN may be dropped.

In the second operation ②, the message manager 1211 may identify the drop of the second packet MP2 of the message MSG and may store the packet descriptor information PDI of the at least one error bit which causes the drop of the second packet MP2 in the log register 1212.

For example, the packet descriptor information PDI may include the packet location information including an index value of the dropped second packet MP2 among the one or more packets MP1 to MPN of the message MSG, the byte location information including an index value of "x" of the error byte including the error bit which causes the drop of the second packet MP2 among bytes corresponding to the second packet MP2, and the bit location information including the index value "y" of the error bit among the eight bits corresponding to the error byte.

In the third operation ③, the message manager 1111 of the host device 1100 may determine that the message MSG is dropped when the message response MSGR corresponding to the message MSG is not received within the reference time period. The message manager 1111 may request an error analysis of the dropped message MSG from the error analyzer 1112.

In the fourth operation ④, the error analyzer 1112 may provide the get state command GSC to the message manager 1211 of the storage device 1200. The get state command GSC may refer to an operation of checking the status of the storage device 1200.

In the fifth operation ⑤, the message manager 1211 of the storage device 1200 may check that the packet descriptor information PDI is stored in the log register 1212 based on the get state command GSC and may provide the control primitive specific response CPSR to the error analyzer 1112. The control primitive specific response CPSR may include the packet descriptor flag PDF. The packet descriptor flag PDF may have a first bit value (a bit value indicating that stored packet descriptor information PDI exists).

In the sixth operation ⑥, responding that the packet descriptor flag PDF includes a first bit value, the error analyzer 1112 may provide the get packet descriptor command GPDC to the message manager 1211 of the storage device 1200.

In the seventh operation ⑦, the message manager 1211 of the storage device 1200 may generate the packet descriptor response PDR based on the get packet descriptor command GPDC. The packet descriptor response PDR may include the packet descriptor information PDI.

For example, the packet descriptor response PDR may include packet location information for identifying the dropped second packet MP2 among the one or more packets MP1 to MPN of the message MSG, byte location information for identifying an error byte including an error bit which causes a drop among bytes corresponding to the second packet MP2 and bit location information for identifying an error bit among the 8 bits corresponding to the error byte.

As another example, when there are multiple error bits which cause a drop, the packet descriptor response PDR may include information for identifying all the multiple error bits.

In the eighth operation ⑧, based on the control primitive specific response CPSR and the packet descriptor response PDR, the error analyzer 1112 may identify the error bit(s) which causes the drop of the second packet MP2 of the message MSG, and may generate a corrected message by correcting the identified error bit(s).

In the ninth operation ⑨, the message manager 1111 of the host device 1100 may provide a corrected message MSG with corrected error bit(s) (i.e., normal bits) to the message manager 1211 of the storage device 1200. That is, the message manager 1111 may retry the MCTP-based communication by utilizing the corrected message.

FIG. 7 is a flowchart illustrating a method of operating the storage device according to some embodiments of the present disclosure. Referring to FIG. 7, the storage device may communicate with the host device. The host device and the storage device may support the MCTP.

In operation S210, the storage device may receive the message MSG from the host device. The message MSG may be an MCTP-based communication signal.

In operation S220, the storage device may determine whether the message MSG is successfully received. In response to determining that the storage device has successfully received the message MSG, the storage device may perform operation S221. In response to determining that the message MSG is not successfully received, the storage device may perform operation S230.

In operation S221, the storage device may provide the message response MSGR indicating a success state of the message MSG to the host device.

In operation S230, the storage device may determine whether rejection conditions of the message MSG are satisfied. In response to determining that the rejection conditions of the message MSG are satisfied, the storage device may perform operation S231. In response to determining that the rejection conditions of the message MSG are not satisfied, the storage device may perform operation S240.

In operation S231, the storage device may provide the message response MSGR indicating a failure state of the message MSG to the host device. In this case, the message MSG may be referred to as a "rejected".

In operation S240, the storage device may record bit information of a dropped packet among packets of the message MSG. In this case, the message MSG may be referred to as a "dropped". The storage device may not provide the host device with the message response MSGR indicating the reception state (e.g., success state or failure state) of the message MSG.

Rejection of the message MSG may be different from dropping the message MSG. For example, when the transmission situation of the message MSG corresponds to the rejection conditions enumerated in the MCTP standard, the message MSG may be rejected. As another example, when the transmission state of the message MSG does not correspond to a rejection condition, but some packets of the message MSG are transmitted abnormally, the message MSG may be dropped.

In some embodiments, when the transmission waiting time of the packet of the message MSG exceeds the timeout period, the corresponding packet may be dropped. In other words, when packet transmission is excessively delayed in time, the packet may be dropped.

In some embodiments, when the packet sequence number of a packet in the message MSG violates a packet generation rule, the corresponding packet may be dropped. For example, a packet may include a packet sequence number field. When the value written in the packet sequence number field violates modular arithmetic rules defined between endpoint devices, the corresponding packet may be dropped.

In some embodiments, when the packet size of a packet of the message MSG exceeds the declared packet size, the corresponding packet may be dropped. For example, the size of the first packet included in the message MSG may be referred to as a "declared packet size". Afterwards, when the size of a subsequent packet of the message MSG exceeds the declared packet size, the corresponding packet may be dropped.

In some embodiments, when there is an error in an integrity check (IC) field of the packet of the message MSG, the corresponding packet may be dropped. For example, according to the integrity check (IC) rule, when the integrity check (IC) field has a first bit value (e.g., "1"), a message integrity check of the corresponding packet may be performed. When the integrity check (IC) field has a second bit value (e.g., "0"), a message integrity check of the corresponding packet may not be performed.

When, contrary to the declared rule, the integrity check (IC) field has a first bit value and the body field of the message integrity check is empty (e.g., the body field has a null value or a dummy value) or, when the integrity check (IC) field has the second bit value and the body field of the message integrity check is filled, it may be determined that an error exists in the integrity check (IC) field of the corresponding packet. In this case, the corresponding packet may be dropped.

The above-described conditions are provided only for better understanding of the drop of the message MSG of the present disclosure and are not intended to limit the scope of the present disclosure. In addition to the conditions described above, the message MSG may be dropped under other conditions.

Figure 8:
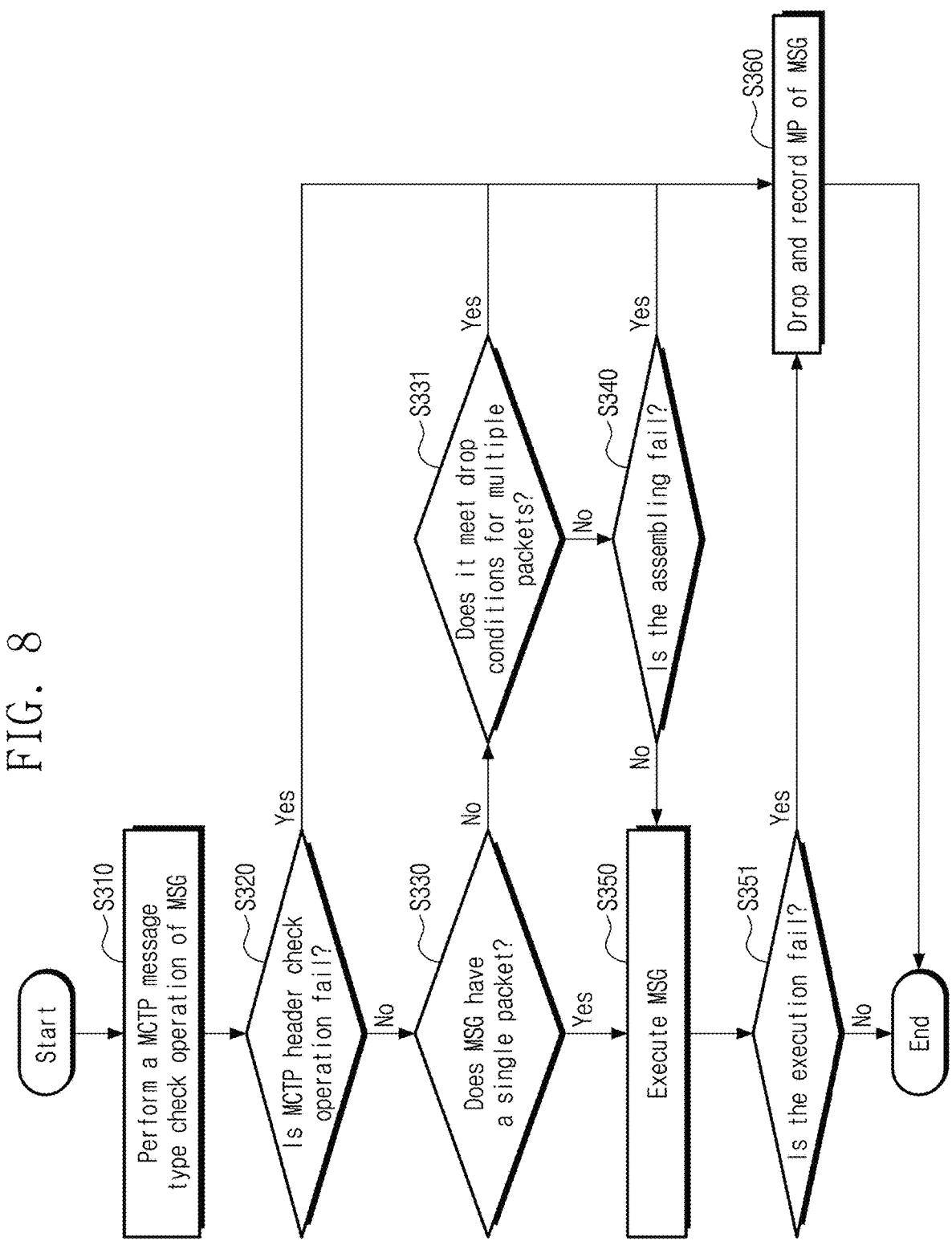
FIG. 8 is a flowchart explaining a method of operating a storage device according to some embodiments of the present disclosure.

FIG. 8 is a flowchart illustrating a method of operating the storage device according to some embodiments of the present disclosure. Referring to FIG. 8, the storage device may communicate with the host device. The host device and the storage device may support the MCTP.

In operation S310, the storage device may perform an MCTP message type check operation of the message MSG received from the host device. The storage device may determine that the type of the message MSG corresponds to the MCTP message type. For example, each of the one or more packets of the message MSG may have the MCTP packet structure. In some embodiments, operation S310 may be performed when the message MSG is not rejected.

In operation S320, the storage device may perform an MCTP header check operation. For example, the storage device may determine whether the value written in the packet sequence number field of the MCTP transport header satisfies packet generation rules (e.g., modular operation rules). When the MCTP header check operation fails (e.g., packet creation rules are violated), the storage device may perform operation S360. When the MCTP header check operation does not fail (e.g., when the packet creation rule is satisfied), the storage device may perform operation S330.

In operation S330, the storage device may determine whether the message MSG has a single packet. When the message MSG is determined to have a single packet, the storage device may perform operation S350. When the message MSG is determined to have multiple packets, the storage device may perform operation S331.

In operation S331, the storage device may determine whether drop conditions for multiple packets are satisfied. For example, when the storage device receives one of the multiple packets which constitute the message MSG and the transmission waiting time exceeds the timeout period until receiving the next packet, the storage device may determine that the drop conditions are satisfied. When the drop conditions are satisfied, the storage device may perform operation S360. When the drop conditions are not satisfied, the storage device may perform operation S340.

In operation S340, the storage device may assemble multiple packets to restore the message MSG. The storage device may determine whether assembly of multiple packets is failed. For example, when the size of one of the multiple packets exceeds the declared packet size, the assembly of the multiple packets may fail. When the assembly fails, the storage device may perform operation S360. When the assembly does not fail, the storage device may perform operation S350.

In operation S350, the storage device may execute the message MSG which is a single packet, or the message MSG which is restored by assembling multiple packets. Executing the message MSG may include executing an integrity check operation of the message MSG.

In operation S351, the storage device may determine whether the execution is failed. For example, when the integrity check operation of the message MSG is failed (i.e., when an error exists in the integrity check (IC) field), the storage device may determine that execution of the message MSG is failed. When execution of the message MSG is successful, the transmission operation of the message MSG is completed, and a message response indicating a success state may be returned to the host device. When execution of the message MSG fails, the storage device may perform operation S360.

In operation S360, the storage device may drop the packet MP of the message MSG and may write packet descriptor information describing the error bit which causes the dropping of the packet MP to the log register of the storage device.

Figure 9:
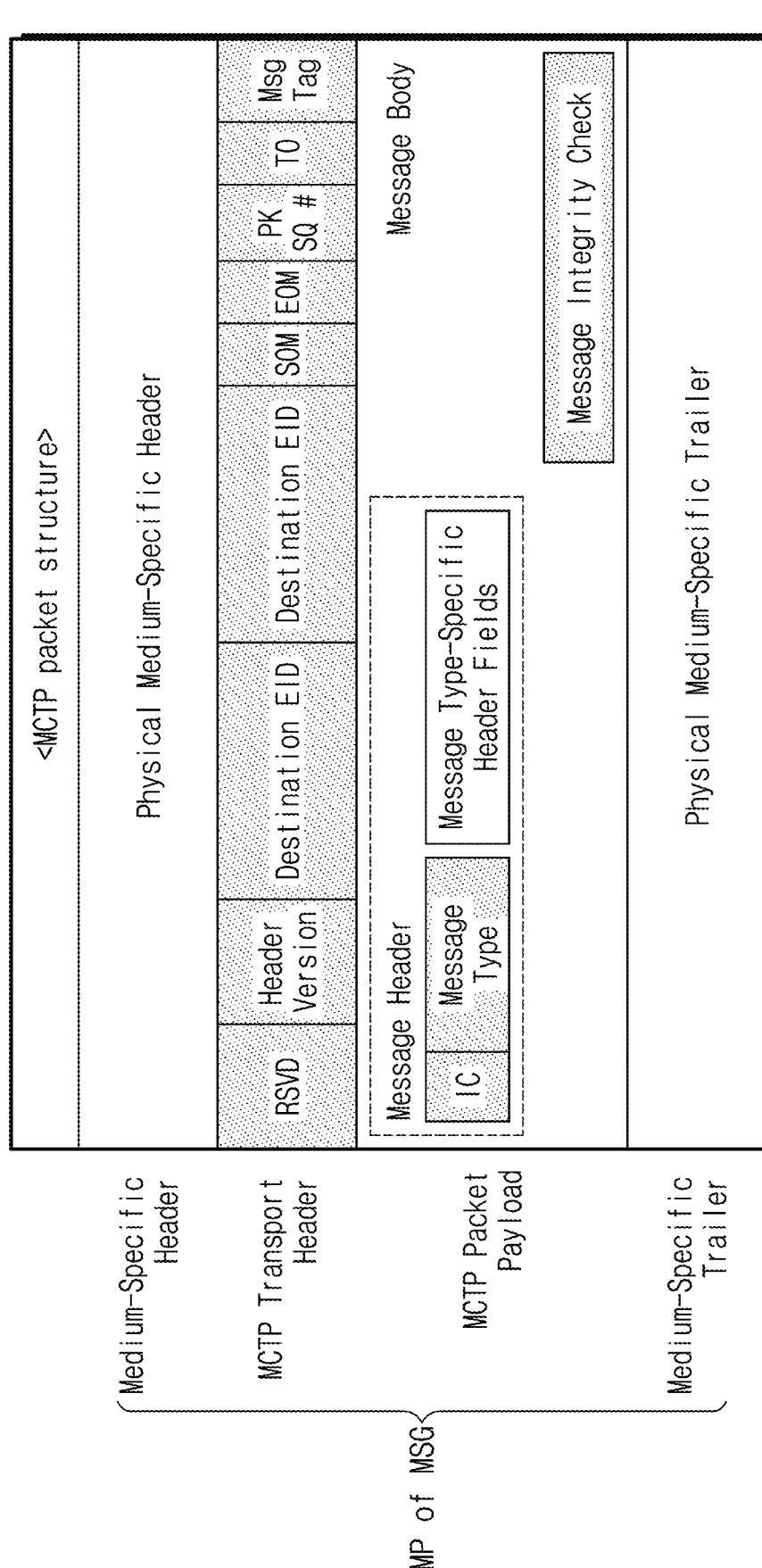
FIG. 9 is a diagram illustrating a management component transport protocol (MCTP) packet structure according to some embodiments of the present disclosure.

FIG. 9 is a diagram illustrating the MCTP packet structure according to some embodiments of the present disclosure. Referring to FIG. 9, the message MSG may include one or more packets MP. Each of the one or more packets MP may have the MCTP packet structure.

The MCTP packet structure may include a medium-specific header, an MCTP transport header, an MCTP packet payload, and a medium-specific trailer.

The medium-specific header may include a physical medium-specific header field. The physical medium-specific header field may describe the physical layer (e.g., a system management bus (SMBus), a peripheral component interconnect vendor defined message (PCI-VDM)) which uses the MCTP.

The MCTP transport header may include a reserved field, a header version field, a destination EID field, a source EID field, a Start Of Message SOM field, an End Of Message EOM field, a packet sequence number field, and a Tag Owner TO field, and a message tag field.

In some embodiments, the packet sequence number field may be used to determine whether to drop the message MSG. For example, when the value of the packet sequence number field violates the packet creation rule, the corresponding packet MP may be dropped.

The MCTP packet payload may also be referred to as "the message body". The message body may include a message header. The message header may include the integrity check (IC) field, a message type field, and a message type-specific header field. The message body may include a message integrity check field.

In some embodiments, the integrity check (IC) field and the message integrity check field may be used to determine whether to drop the message MSG. For example, when the integrity check (IC) field has a first bit value and the message integrity check field is empty, or the integrity check (IC) field has a second bit value and the message integrity check field is filled, the corresponding packet MP may be dropped.

In some embodiments, the SOM field and the EOM field may be used to determine whether to drop the message MSG. For example, the size of the packet MP may be determined based on the SOM field and the EOM field. When the size of the packet MP exceeds the declared packet size, the corresponding packet MP may be dropped.

A medium-specific trailer may include a physical medium-specific trailer field. For example, the physical medium-specific trailer field may include a data integrity field.

FIG. 10 is a diagram explaining a CPSR structure according to some embodiments of the present disclosure. Referring to FIG. 10, the control primitive specific response CPSR may have the CPSR structure defined in the NVMe-MI standard. The CPSR structure may have a size of 16 bits. The CPSR structure may include bit "00" to bit "15".

Bit "00" and bit "01" may indicate a slot command servicing state SSTA. The SSTA may correspond to one of the following states: idle state, receive state, processing state, and transmit state. Bit "02" is a reserved field. Bit "03" may indicate a common message to non-idle command slot CMNICS.

Bit "04" may indicate a bad message integrity check error (BMICE). Bit "05" may indicate a timeout waiting for a packet (WPTT). Bit "06" may indicate an unsupported transmission unit (UTUNT). Bit "07" may indicate a bad header version (BHVS).

Bit "08" may indicate an unknown destination ID (UDSTID). Bit "09" may indicate an incorrect transmission unit (ITU). Bit "10" may indicate an unexpected middle or end of packet (UMEP). Bit "11" may indicate an out-of-sequence packet sequence number (OSPSN).

Bit "12" may indicate a bad, unexpected or expired message tag (BUEMT). Bit "13" may indicate a bad packet or other physical layer (BPOPL). Bit "14" may indicate NVM subsystem reset occurred (NSSRO). Bit "15" may indicate a pause flag (PFLG).

According to some embodiments of the present disclosure, the packet descriptor flag PDF may be added to bit "02", a reserved field in the CPSR structure. The host device may check whether packet descriptor information is stored in the storage device by referring to the bit value of the packet descriptor flag PDF stored in the reserved field of the CPSR structure.

FIG. 11 is a diagram illustrating a basic management data structure according to some embodiments of the present disclosure. Referring to FIG. 11, the packet descriptor response PDR may have the basic management data structure defined in the NVMe-MI standard.

The basic management data structure may have a size of 256 bytes. Byte "00" to byte "07" may indicate dynamic health data. More specifically, byte "00" may indicate the length of the status. Byte "01" may indicate a status flag (SFLGS). Byte "02" may indicate smart warnings. Byte "03" may indicate a composite temperature (CTemp). Byte "04" may indicate a percentage drive life used (PDLU). Byte "05" may indicate a composite temperature exceeding the temperature warning threshold. Byte "06" may indicate current power consumption. Byte "07" may indicate a packet error check (PEC) code.

Byte "08" to byte "31" may indicate product data. More specifically, byte "08" may indicate the length of identification (ID). Byte '09' and byte "10" may indicate the vendor ID. Byte "11" to byte "30" may indicate the serial number. Byte "31" may indicate the packet error check (PEC) code.

Byte "32" to byte "255" may be a vendor-specified field. According to some embodiments of the present disclosure, the packet descriptor information PDI may be added within a vendor specific field of the basic management data structure. The host device may obtain the packet descriptor information PDI for the dropped packet by referring to the vendor specification field of the packet descriptor response PDR with a basic management data structure.

The packet descriptor response PDR with one error bit causing a packet to be dropped will be described in more detail with reference to FIG. 12. The packet descriptor response PDR with multiple error bits causing a packet to be dropped will be described in more detail with reference to FIG. 13.

FIG. 12 is a diagram illustrating a message and a packet descriptor response according to some embodiments of the present disclosure. Referring to FIG. 12, the message MSG may include one or more packets MP1 to MPN. The second packet MP2 may be dropped. For example, the second packet MP2 may have an error bit which causes a drop.

The byte "00" among bytes "00" to "15" of the second packet MP2 may be an error byte including an error bit. Among bits "0" to "7" corresponding to the byte "00", the bit "1" may be an error bit which causes the second packet MP2 to be dropped. That is, the message MSG may include a single error bit.

The packet descriptor response PDR may include dynamic health data, product data, and the packet descriptor information PDI of the message MSG. The packet descriptor information PDI may be added within the vendor specific field.

The vendor specific field for storing the packet descriptor information PDI may include a packet location field PLF, a byte location field BYLF, and a bit location field BLF.

The packet location field PLF may have a size of 1 byte. The packet location field PLF may indicate the packet index of a dropped packet (i.e., a packet with an error bit) from packet index "0" to packet index "255". When the number 'N' of packets MP1 to MPN in the message MSG is greater than 256, the size of the packet location field PLF may be increased.

The byte location field BYLF may have a size of 2 bytes. The byte location field BYLF may indicate the byte index of the error byte with the error bit among byte index "0" to byte index "65535".

The bit location field BLF may have a size of 3 bits. The bit location field BLF may indicate the bit index of the error bit among bit index "0" to bit index "7".

Figure 13:
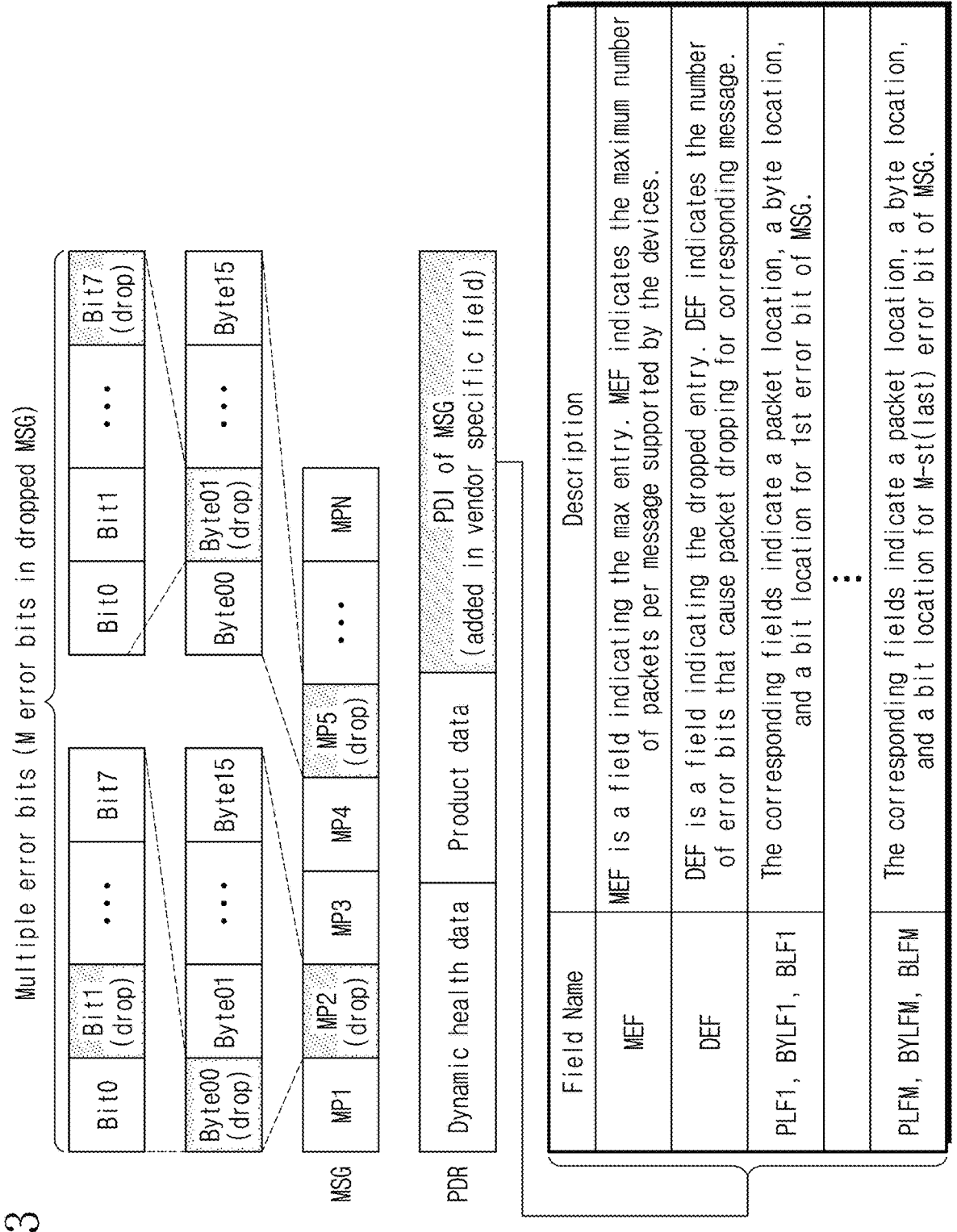
FIG. 13 is a diagram illustrating a message and a packet descriptor response according to some embodiments of the present disclosure.

FIG. 13 is a diagram illustrating a message and a packet descriptor response according to some embodiments of the present disclosure. Referring to FIG. 13, the message MSG may include one or more packets MP1 to MPN. Among the one or more packets MP1 to MPN, some packets may be dropped due to M error bits. M is a natural number. Hereinafter, for better understanding of the present disclosure, it is assumed that the M error bits include the error bits of the second packet MP2 and the error bits of the fifth packet MP5.

Each of the second and fifth packets MP2 and MP5 may have an error bit which causes a drop.

The byte "00" among bytes "00" to "15" of the second packet MP2 may be an error byte including an error bit. Among bit "0" to bit "7" corresponding to the byte "00" of the second packet MP2, the bit "1" may be an error bit which causes the second packet MP2 to be dropped. The byte "01" among bytes "00" to "15" of the fifth packet MP5 may be an error byte including an error bit. Among bit "0" to bit "7" corresponding to the byte "01" of the fifth packet MP5, the bit "7" may be an error bit which causes the fifth packet MP5 to be dropped. That is, the message MSG may include multiple error bits.

The packet descriptor response PDR may include dynamic health data, product data, and the packet descriptor information PDI of the message MSG. The packet descriptor information PDI may be added within the vendor specific field.

The vendor specific field for storing the packet descriptor information PDI may include a maximum entry field MEF, a dropped entry field DEF, and fields describing first to Mth error bits.

The maximum entry field MEF may indicate the maximum number of packets per message supported by endpoint devices (e.g., a host device and a storage device).

The dropped entry field DEF may indicate the number (i.e., "M") of error bits causing packet drops among all packets included in the corresponding message.

Among the fields describing the first to Mth error bits, the fields describing the first error bit are a first packet location field PLF1, a first byte location field BYLF1, and a first bit location field BLF1. The first packet location field PLF1 may store first packet location information indicating a packet including the first error bit. The first byte location field BYLF1 may store first byte location information indicating the first error byte with the first error bit among bytes of the corresponding packet. The first bit location field BLF1 may store first bit location information indicating the first error bit among eight bits corresponding to the first error byte.

Similarly, among the fields describing the first to Mth error bits, the fields describing the Mth error bit may include an Mth packet location field PLFM, an Mth byte location field BYLFM, and an Mth bit location field BLFM. The Mth packet location field PLFM may store Mth packet location information indicating a packet including the Mth error bit. The Mth byte location field BYLFM may store Mth byte location information indicating the Mth error byte including the Mth error bit among bytes of the corresponding packet. The Mth bit location field BLFM may store the Mth bit location information indicating the Mth error bit among 8 bits corresponding to the Mth error byte.

Figure 14:
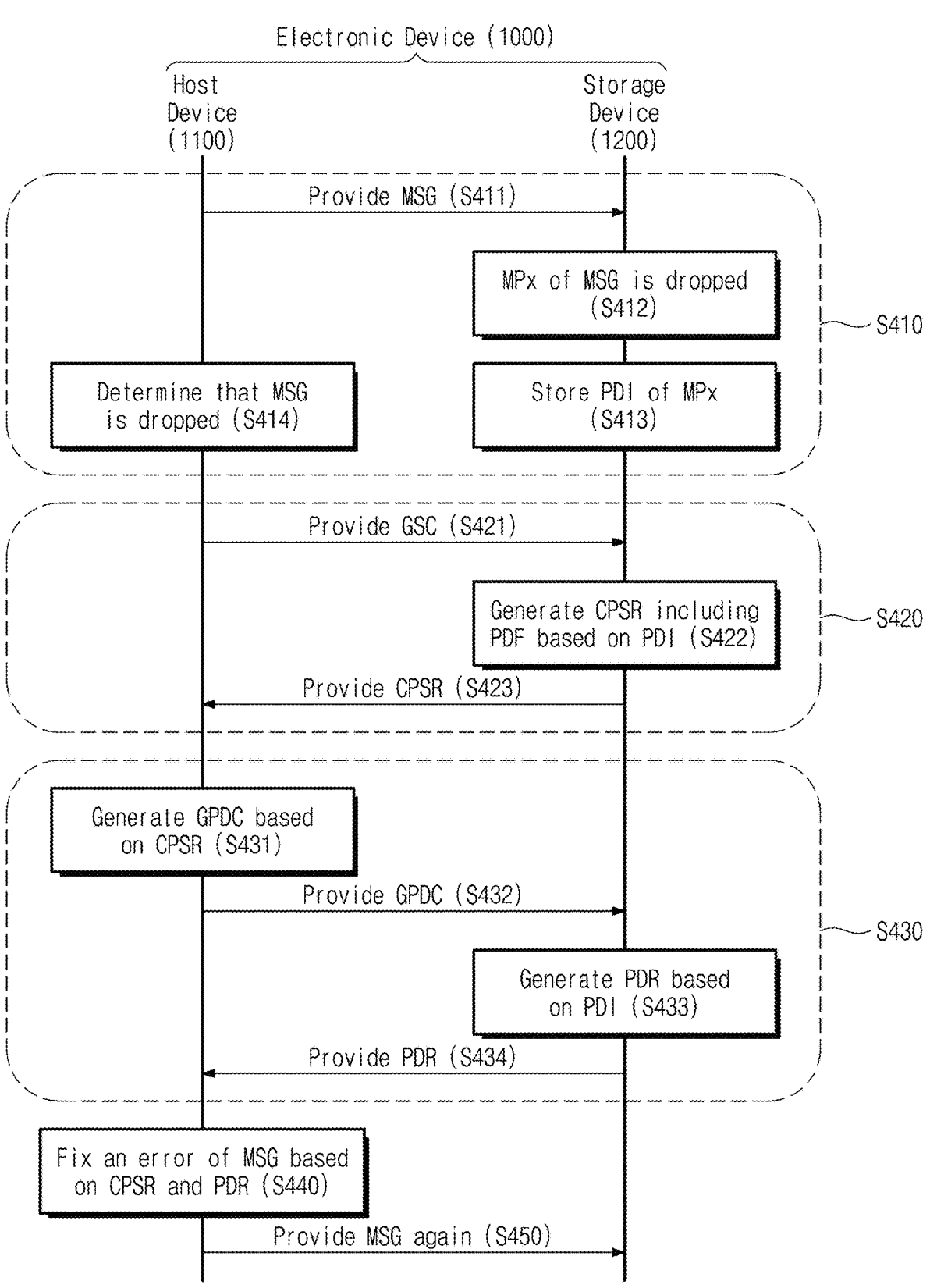
FIG. 14 is a flowchart explaining a method of operating an electronic device according to some embodiments of the present disclosure.

FIG. 14 is a flowchart explaining a method of operating an electronic device according to some embodiments of the present disclosure. Referring to FIG. 14, the electronic device 1000 may include the host device 1100 and the storage device 1200.

Operation S410 may include operation S411, operation S412, operation S413, and operation S414. In operation S411, the host device 1100 may provide the message MSG to the storage device 1200. In operation S412, a packet MPx (e.g., one of first to Nth packets MP1 to MPN) among packets of the message MSG may be dropped. In operation S413, the storage device 1200 may store the packet descriptor information PDI of the dropped packet MPx in the log register of the storage device 1200. The packet descriptor information PDI may include packet location information for identifying the dropped packet MPx, byte location information for identifying the error byte with the error bit causing the drop in the dropped packet MPx, and bit location information for identifying error bits within the error byte. In operation S414, the host device 1100 may determine that the message MSG is dropped in response to not receiving a message response corresponding to the message MSG during the reference time period.

Operation S420 may include operation S421, operation S422, and operation S423. In operation S421, the host device 1100 may provide the get state command GSC to the storage device 1200. In operation S422, the storage device 1200 may generate the control primitive specific response CPSR including the packet descriptor flag PDF based on the packet descriptor information PDI stored in the log register. The packet descriptor flag PDF may describe whether information about the error bit which caused the drop is stored in the log register. In operation S423, the storage device 1200 may provide the control primitive specific response CPSR to the host device 1100.

Operation S430 may include operation S431, operation S432, operation S433, and operation S434. In operation S431, the host device 1100 may generate the get packet descriptor command GPDC based on the packet descriptor flag PDF of the control primitive specific response CPSR. In operation S432, the host device 1100 may provide the get packet descriptor command GPDC to the storage device 1200. In operation S433, the storage device 1200 may generate the packet descriptor response PDR including packet descriptor information PDI based on the packet descriptor information PDI stored in the log register. In operation S434, the storage device 1200 may provide the packet descriptor response PDR to the host device 1100.

In operation S440, the host device 1100 may correct an error in the message MSG based on the control primitive specific response CPSR and the packet descriptor response PDR. For example, the host device 1100 may correct an error bit which caused a drop in the message MSG.

In operation S450, the host device 1100 may provide the message MSG again to the storage device 1200. The message MSG provided again may be the message MSG of which error bits are corrected in operation S440.

According to an embodiment of the present disclosure, a storage device providing a packet descriptor flag, a method of operating the same, and a method of operating an electronic device including the same are provided.

Additionally, because the host device corrects an error bit of a dropped packet based on packet descriptor information stored in the storage device, a message including the dropped packet may be corrected efficiently and accurately.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating an electronic device which includes a host device and a storage device, the method comprising:

providing, by the host device, a first message including a plurality of packets to the storage device;

providing, by the host device, a first command for checking a status of the storage device to the storage device;

providing, by the storage device in response to the first command, the host device with a first response including a packet descriptor flag indicating that a first packet among the plurality of packets of the first message is dropped; and providing, by the host device, the storage device with a second command requesting first packet descriptor information of the first packet based on the packet descriptor flag of the first response.

2. The method of claim 1, wherein the host device is configured to generate the first command when a first message response indicating a success state or a failure state of the first message is not received from the storage device during a reference time period.

3. The method of claim 1, further comprising:

before the first command is provided, storing, by the storage device, the first packet descriptor information of the first packet dropped from among the plurality of packets of the first message in a log register of the storage device.

4. The method of claim 3, wherein the storage device is configured to store the first packet descriptor information of the first packet in the log register in response to determining that the first packet of the first message satisfies drop conditions, and wherein the drop conditions include at least one of conditions:

that a transmission waiting time of the first packet exceeds a timeout period;

that a packet sequence number of the first packet violates a packet generation rule;

that a packet size of the first packet exceeds a declared packet size; and that an error exists in an integrity check (IC) field of the first packet.

5. The method of claim 3, wherein the first packet includes a first error bit that caused the first message to be dropped, and wherein the first packet descriptor information includes:

first packet location information for identifying the first packet among the plurality of packets of the first message;

first byte location information for identifying an error byte including the first error bit from among a plurality of bytes corresponding to the first packet; and

first bit location information for identifying the first error bit among eight bits corresponding to the error byte.

6. The method of claim 1, further comprising:

providing, by the storage device in response to the second command, a second response including the first packet descriptor information of the first packet to the host device.

7. The method of claim 5, further comprising:

generating, by the host device, a corrected message by correcting the first error bit of the first packet of the first message based on the first response and a second response; and providing, by the host device, the corrected message to the storage device.

8. The method of claim 1, further comprising:

providing, by the host device, a second message including a plurality of additional packets to the storage device;

determining, by the storage device, that the second message is successfully received; and providing, by the storage device, a second message response indicating a success state of the second message to the host device in response to determining that the second message is successfully received.

9. The method of claim 1, further comprising:

providing, by the host device, a second message including a plurality of additional packets to the storage device;

determining, by the storage device, that the second message is not successfully received and that rejection conditions of the second message are satisfied; and providing, by the storage device, a second message response indicating a failure state of the second message to the host device in response to determining that the second message is not successfully received and that the rejection conditions of the second message are satisfied.

10. The method of claim 1, further comprising:

providing, by the host device, a second message including a plurality of additional packets to the storage device;

determining, by the storage device, that the second message is not successfully received and rejection conditions of the second message are not satisfied; and storing, by the storage device, additional packet descriptor information of an additional packet including an additional error bit from among the plurality of additional packets of the second message in a log register of the storage device in response to determining that the second message is not successfully received and that the rejection conditions of the second message are not satisfied, and wherein the storage device does not provide a second message response of the second message to the host device.

11. The method of claim 1, wherein the first packet among the plurality of packets of the first message includes a first error bit, wherein a second packet of the plurality of packets of the first message includes a second error bit, and wherein the packet descriptor flag of the first response indicates that at least some of the plurality of packets are dropped.

12. The method of claim 11, further comprising:

providing, by the storage device, a second response to the host device based on the second command, wherein the second response includes:

maximum entry information indicating the maximum number of packets per message supported by the host device and the storage device;

dropped entry information indicating the number of error bits causing packet drops in the first message;

the first packet descriptor information including first packet location information, first byte location information, and first bit location information of the first packet; and second packet descriptor information including second packet location information, second byte location information, and second bit location information of the second packet.

13. The method of claim 1, wherein the host device and the storage device support a management component transport protocol (MCTP), and wherein each of the plurality of packets of the first message includes an MCTP packet structure.

14. The method of claim 13, wherein the first response includes a control primitive specific response (CPSR) structure defined in an NVMe-MI (Non-Volatile Memory express Management Interface) standard, and wherein the packet descriptor flag is written in a reserved field of the CPSR structure.

15. The method of claim 13, further comprising:

providing, by the storage device, a second response to the host device based on the second command, wherein the second response includes a basic management data structure defined in an NVMe-MI standard, and wherein the first packet descriptor information of the first packet is written in a vendor specific field of the basic management data structure.

16. A method of operating a storage device which communicates with a host device, the method comprising:

receiving a first message including a plurality of packets from the host device;

storing packet descriptor information of a dropped packet among the plurality of packets in a log register of the storage device;

receiving a first command for checking a status of the storage device from the host device; and providing, based on the first command and the packet descriptor information, the host device with a first response including a packet descriptor flag indicating that the dropped packet exists.

17. The method of claim 16, further comprising:

receiving a second command for identifying the dropped packet from the host device;

providing, based on the second command, a second response including the packet descriptor information of the dropped packet to the host device; and receiving a second message generated by correcting an error bit of the dropped packet of the first message from the host device.

18. A storage device comprising:

a log register; and a message manager configured to receive a first message including a plurality of packets from a host device and to store packet descriptor information of a dropped packet among the plurality of packets in the log register when the dropped packet exists, wherein the message manager is further configured to:

receive a first command for checking a status of the storage device from the host device; and provide, based on the first command and the packet descriptor information stored in the log register, the host device with a first response including a packet descriptor flag indicating that the dropped packet exists.

19. The storage device of claim 18, wherein the message manager is further configured to:

after providing the first response, receive a second command for identifying the dropped packet from the host device;

provide, based on the second command, the host device with a second response including the packet descriptor information of the dropped packet by referring to the log register; and receive a second message generated by correcting an error bit of the dropped packet of the first message from the host device.

20. The storage device of claim 19, wherein the packet descriptor information includes:

packet location information for identifying the dropped packet among the plurality of packets of the first message;

byte location information for identifying an error byte including the error bit among a plurality of bytes corresponding to the dropped packet; and bit location information for identifying the error bit among eight bits corresponding to the error byte.

* * * * *